(12) United States Patent  
Derrick et al.

(10) Patent No.: US 6,530,592 B2  
(45) Date of Patent: Mar. 11, 2003

(54) GAS BAG MODULE COVER ASSEMBLY AND GAS BAG MODULE

(75) Inventors: John-Oliver Derrick, Hettstadt (DE); Ralph Heindl, Hösbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/896,517

(22) Filed: Jun. 29, 2001

(65) Prior Publication Data

US 2002/0000712 A1 Jan. 3, 2002

(30) Foreign Application Priority Data

Jun. 30, 2000  (DE) ..................................... 200 11 466 U

(51) Int. Cl.[7] .............................................. B62R 21/20
(52) U.S. Cl. ..................................... 280/728.3; 280/731
(58) Field of Search .......................... 280/728.3, 731, 280/743.1, 750, 751; B60R 21/16

(56) References Cited

U.S. PATENT DOCUMENTS

| | | | |
|---|---|---|---|
| 1,495,456 A | | 5/1924 | Swank |
| 5,294,147 A | * | 3/1994 | Edge ........................ 280/728.3 |
| 5,678,851 A | * | 10/1997 | Saito et al. ............... 280/728.3 |
| 5,685,056 A | | 11/1997 | Fischer |
| 5,851,022 A | * | 12/1998 | Yamamoto et al. ....... 280/728.3 |
| 5,947,511 A | * | 9/1999 | Usui et al. ................... 264/255 |
| 6,099,027 A | * | 8/2000 | Shirk et al. ............... 280/728.3 |
| 6,135,489 A | * | 10/2000 | Bowers ..................... 280/728.3 |
| 6,149,186 A | * | 11/2000 | Manfrin .................... 280/728.2 |
| 6,164,690 A | * | 12/2000 | Vian ......................... 280/728.2 |
| 6,247,724 B1 | * | 6/2001 | Jambor et al. ............ 280/728.2 |
| 6,322,100 B1 | * | 11/2001 | Cuevas et al. ............ 280/728.2 |

FOREIGN PATENT DOCUMENTS

| | | | |
|---|---|---|---|
| DE | 19929762 A1 | 1/2000 | |
| DE | 29921744 U1 | * 4/2000 | ........... B60R/21/16 |
| DE | 19925545 A1 | 12/2000 | |
| JP | 05139231 | 6/1993 | |
| JP | 05139231 A | * 6/1993 | ........... B60R/21/16 |
| JP | 09048315 | 2/1997 | |
| JP | 10035389 A | 2/1998 | |
| JP | 2001233140 A | * 8/2001 | ........... B60R/13/00 |
| WO | WO0034083 | 6/2000 | |
| WO | WO 200034083 | * 6/2000 | ........... B60R/21/16 |

\* cited by examiner

*Primary Examiner*—Brian L. Johnson  
*Assistant Examiner*—Kelly E Campbell  
(74) *Attorney, Agent, or Firm*—Tarolli, Sundheim, Covell & Tummino L.L.P.

(57) ABSTRACT

A gas bag module cover assembly, comprising a cover with a front side externally visible in an installed state of the cover and a rear side and comprising at least one emblem designed as a separate part and visible on the front side. The emblem is designed such that it can be mounted from the rear side, the cover having at least one opening through which a section of the emblem protrudes. The section is visible on the front side, and the emblem has a rear holding projection protruding laterally with respect to the opening and being attached to the cover. The invention further relates to a gas bag module equipped with such a module cover assembly.

12 Claims, 3 Drawing Sheets

GAS BAG MODULE COVER ASSEMBLY AND GAS BAG MODULE

TECHNICAL FIELD

The invention relates to a gas bag module cover assembly and to a gas bag module equipped with such a cover assembly.

BACKGROUND OF THE INVENTION

In the case of module cover assemblies provided with an emblem and a cover, these emblems attached to the covers are made predominantly of metal and become more and more extravagant. When the cover assembly is opened by the gas bag there is, however, the demand that the relatively heavy emblem remains reliably attached to the cover. For this reason, the emblems are secured to the covers on the rear side thereof by holding plates which unfortunately increase the weight of the emblem and to which the emblems are attached by screws or rivets.

BRIEF SUMMARY OF THE INVENTION

The invention provides a cover assembly comprising an emblem which can be produced more simply and can be attached to the cover in simpler manner. This is achieved with a cover assembly which comprises a cover having a front side externally visible in an installed state of the cover assembly and a rear side and having at least one emblem designed as a separate part and visible on the front side. The emblem is designed such that it can be mounted from the rear side, the cover having at least one opening through which a section of the emblem protrudes. The section is visible on the front side, and the emblem has a rear holding projection protruding laterally with respect to the opening and being attached to the rear side. In contrast to the prior art cover assemblies, the emblem according to the cover assembly proposed is attached from the rear side by simply inserting the visible sections in corresponding openings, so that they are visible on the front side. Holding sections which are integrally connected with the visible sections and are not fixed by rivets or screws to the visible section, secure the emblem to the cover. Thus, the entire emblem only consists of one part but not of several parts as is the case in prior art. The emblem does also not abut against the front and rear sides of the cover, to be clamped therebetween in a manner comparable with two clamping plates connected via screws. Hence, there is also the advantage that on attaching no great joining force is exerted on the emblem, which occurs when a prior art emblem is screwed or riveted. What is called the manufacturing process step of "cutting-off" of the emblem in the subsequently visible area of the emblem may also be omitted thus achieving a greater optical emblem quality. Thus far, the emblems are embossed and then punched out of the sheet of metal, the area visible in the attached state of the emblem having punched edges. According to the invention punching may be made in the area of the emblem which subsequently abuts against the rear side of the cover, so that the quality demands to be made on the punching step can be reduced. Emblem sections which are filigreed on their front side can now be achieved by the invention, which was formerly impossible. Thus far, front sections of the filigreed part would have to extend laterally beyond the opening so as to achieve the clamping of the emblem which is common practice according to the prior art by abutment against the front and rear sides.

The visible section of the front side does preferably not extend laterally beyond the opening, however, it would be conceivable to permit a minimum projection to avoid visible gaps, e.g. when the fit between the visible section and the opening is not made as a press fit.

It is preferred to provide several visible sections with associated openings in the cover. These sections are integrally connected with one another by a common holding projection on the rear side. Preferably all visible front sections are connected integrally by the common holding projection to keep the production cost and assembly effort low.

The holding projection is arrested at the cover on its rear side by receiving pockets, mushroom-like projections or fastening clamps provided on the rear side of the cover or additional holding sheets of metal.

According to the preferred embodiment the holding projection is designed as a holding plate. The holding plate adds to the stability of the cover, supports it across the entire area, so that better haptics of the cover surface can be achieved on the front side. The cover has at least one flap which exposes an outlet opening for the gas bag when the cover assembly is opened. The holding flap connects the flap with non-opened adjacent areas of the cover and thus extends across a hinge region associated with the flap. In this case, the emblem is attached to the cover such that the holding plate is bent when the flap is pivoted, i.e. the hinge region is supported and the flap is still fixed to the cover via the holding plate as well.

The flap is prevented from pivoting back after opening by the bending of the holding plate.

In the gas bag module proposed, which comprises a gas bag, a gas generator and a cover according to the invention, the gas bag, the gas generator and the cover are adapted to each other such that after the deployment of the gas bag the flap is held by the bent holding plate substantially in the fully outwardly pivoted state. This means that the flap remains pivoted outwardly by 180° and does not protrude outwardly by 90° with respect to the outer side of the non-opened cover assembly.

DETAILED DESCRIPTION OF THE PREFERRED EMBODIMENTS

Figure 1:
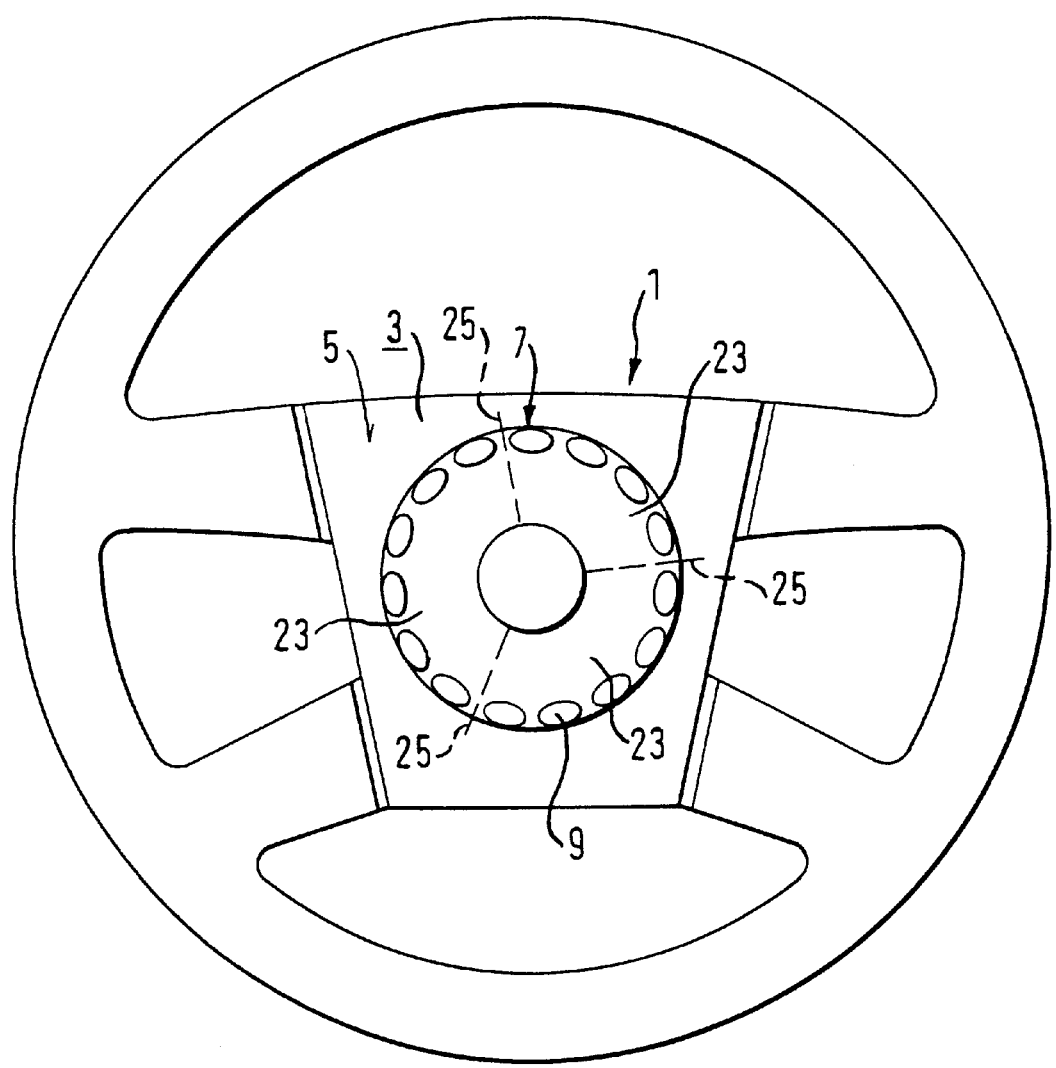
FIG. 1 shows a top view onto a steering wheel having a module cover assembly according to the invention.
Figure 2:
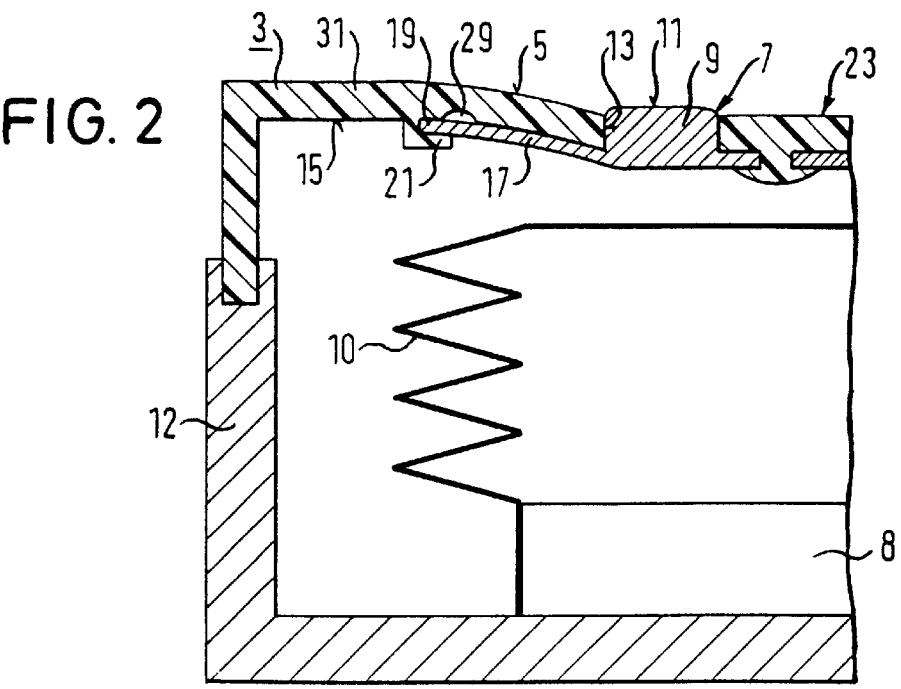
FIG. 2 shows a cross-section through a section of the gas bag module cover assembly of the invention, shown in FIG. 1, according to a first embodiment in the closed condition.
Figure 3:
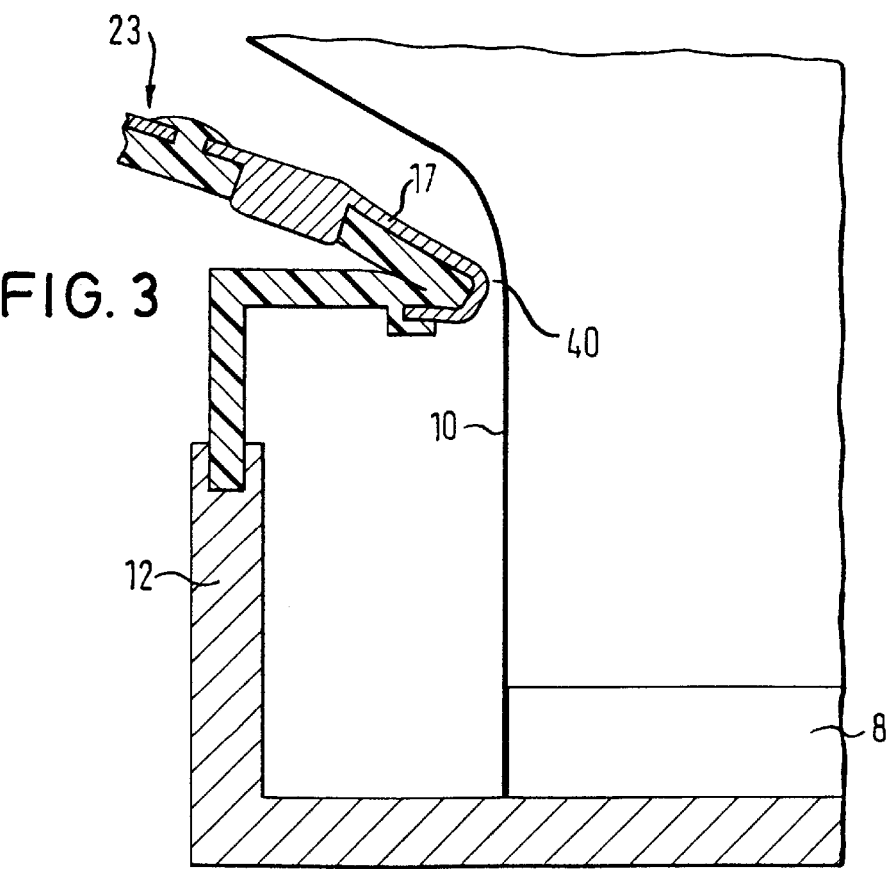
FIG. 3 shows the cover assembly according to FIG. 2 in the open condition.

In FIG. 1, a vehicle steering wheel having a gas bag module 1 in the area of the steering wheel hub is shown, which has a cover assembly comprising a pot-shaped cover 3 and an emblem 7. The cover 3 has a front side 5 shown in FIG. 1. The emblem 7 is attached to the cover 3, which represents a ring composed of filigreed oval parts, is also visible on the front side. Furthermore, the gas bag module consists of a gas generator 8 and a gas bag 10, as shown in FIG. 2, which are accommodated in a container 12 to which the cover 3 is also mounted. The emblem 7 consists of visible journal-like sections 9 whose front side 11 is visible in FIG. 1 and which protrude through the openings 13 in the cover 5. The openings 13 are coordinated with the visible sections 9 such that the sections 9 are held in the openings 13 by means of a press fit. All sections 9 are integrally connected with one another on the rear side 15 of the cover 3 via a holding projection in the form of a holding plate 17. The holding plate 17 extends across a large surface area and stabilizes the cover 3. The edges 19 of the holding plate 17 are inserted in holding pockets 21 integrally molded to the rear side of the cover 3 and are fixed to the cover 3 in this way. As evident from FIG. 2, the visible sections 9 do not protrude laterally on the front side with respect to the opening 13. The emblem 7 is mounted on the rear side, and thus in hidden manner, by simply inserting the integral emblem from behind such that the sections 9 protrude through the openings 13 and the edges 19 snap into the pockets 21. Additional fastening elements are not required, however, an additional adhesive can very well be used. The holding plate 17 markedly protruding laterally with respect to the openings 13 does not only connect the visible sections 9 with one another but the entire emblem is held at the cover 3 even if the cover is opened, as shown in FIG. 3, without additional measures being provided on the front side to secure the emblem, which would be at the expense of optics.

The cover 3 comprises sections in the form of flaps 23 which are separated from one another by lines 25 shown in broken form in FIG. 1. The lines 25 represent limiting lines between adjacent flaps 23. On the rear side, recesses are provided in the cover for this purpose. Hinge regions 29 which are also provided by recessed lines on the rear side of the cover 3 shall facilitate outward pivoting of the flaps 23 in the case of restraint.

Figure 4:
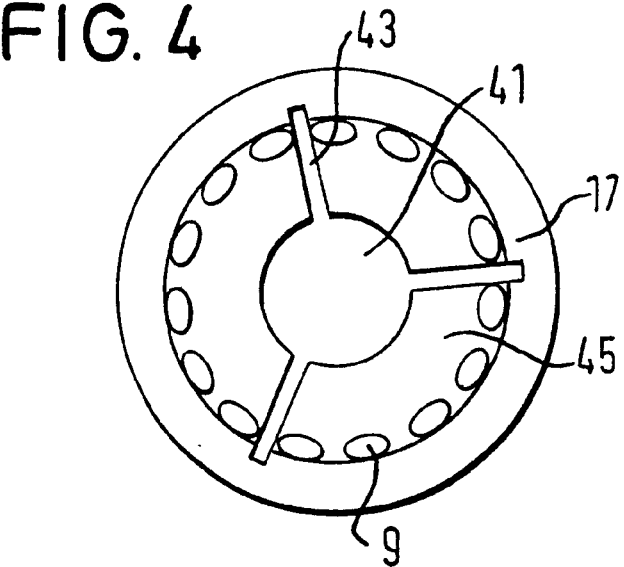
FIG. 4 shows a top view only onto the emblem inserted in the cover assembly according to the preceding Figures.

As evident from FIG. 2, the holding plate 17 extends from the area of the flaps 23 via the hinge regions 29 into that area 31 of cover 3 which is adjacent to flaps 23 and not pivoted in the case of restraint. Since the holding plate 17 is mounted on both the adjacent areas 31 and the flaps 23 and stays fixed also in the pivoted-out state of the flaps (cf. FIG. 3), it is bent plastically in the case of restraint. The gas bag 11 which opens the cover assembly and exposes an exit opening 40, the gas generator 8 and the cover 3 itself are coordinated such that after the deployment of the gas bag 10 (see FIG. 3) the flaps 23 are held substantially in the fully outwardly pivoted state by the bent holding plate 17, i.e. are prevented from pivoting back. The holding plate 17 as a metal part thus influences the opening and closing of the flaps 23. In order to at all enable bending of the holding plate 17 having a large surface area, this plate comprises slots 43 which start from a centric opening 41 in the holding plate (cf. FIG. 4), extend radially outwardly and along the limiting lines 25, through which slots segments 45 associated with the flaps 23 are created in the holding plate 17.

The holding plate 17 also prevents tearing-off of the flaps 23 when the cover is opened thus increasing the operativeness of the module, above all at extreme ambient temperatures.

Figure 5:
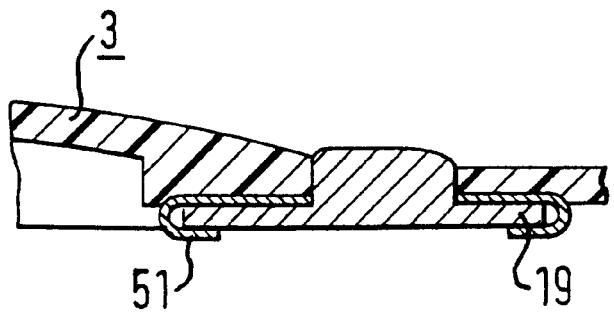
FIG. 5 shows a cross-sectional view through a second embodiment of the gas bag module cover assembly according to the invention, only one section of the cover assembly being shown.

The embodiment according to FIG. 5 provides in place of the pockets 21 a bracket 51 mounted on the rear side of the cover 3, which embraces the edges 19 of holding plate 17.

What is claimed is:

1. A gas bag module cover assembly, comprising:
   a cover having a front side externally visible in an installed state of said cover assembly and a rear side as well as
   at least one emblem designed as a separate part and visible on said front side, said emblem being designed such that it can be mounted from said rear side, said cover having at least one opening through which a section of said emblem protrudes, said section being visible on said front side, and said emblem having a rear holding projection designed as a holding plate and protruding laterally with respect to said opening and being attached to said cover, said cover having at least one flap which when said cover is opened exposes an outlet opening for said gas bag and wherein said holding plate protrudes from said flap via a hinge region associated with said flap into a region of said cover adjoining the latter, said emblem being attached to said cover such that said holding plate is bent when said flap is pivoted.

2. The gas bag module cover assembly according to claim 1, wherein said visible section does not protrude laterally on said front side with respect to said opening.

3. The gas bag module cover assembly according to claim 1, wherein there are provided a plurality of visible sections as well as openings in said cover which are associated with said visible sections, a common holding projection being provided by means of which at least some of said visible sections are integrally connected with one another.

4. The gas bag module cover assembly according to claim 3, wherein all sections visible on said front side are integrally connected with one another by means of said holding projection.

5. The gas bag module cover assembly according to claim 1, wherein receiving pockets are formed on the rear side of said cover, edge portions of said holding projection protruding into said receiving pockets.

6. The gas bag module cover assembly according to claim 1, wherein at least one fastening clamp is provided on said rear side of said cover for arresting said holding projection.

7. The gas bag module cover assembly according to claim 1, wherein said holding plate is attached to said cover in an area of said flap and in an area adjacent to said flap.

8. The gas bag module cover assembly according to claim 1, wherein said holding plate has slots and adjacent flaps have limiting lines between them, said slots extending along said limiting lines of said adjacent flaps.

9. A gas bag module cover assembly, comprising:
   a cover having a front side externally visible in an installed state of said cover assembly and a rear side and having a plurality of openings, and
   at least one emblem designed as a separate part made of one piece and visible on said front side,
   said emblem being designed such that it can be mounted from said rear side and having a plurality of visible sections and a common rear holding projection which protrudes laterally with respect to said openings, which integrally connect said visible sections with each other and which is attached to said cover, and each opening being associated with one of said visible sections which extends through its associated opening to be visible on said front side.

10. The gas bag module cover assembly according to claim 9, wherein said cover has at least one flap which when said cover is opened exposes an outlet opening for said gas bag and wherein said holding projection protrudes from said flap via a hinge region associated with said flap into a region of said cover adjoining the latter, said emblem being attached to said cover such that said holding projection is bent when said flap is pivoted.

11. A gas bag module cover assembly, comprising:
   a cover defined by a wall having a front side externally visible in an installed state of said cover assembly and a rear side and, at least one emblem designed as a separate part and visible on said front side, said emblem being designed such that it can be mounted from said rear side, said cover having at least one opening through which a section of said emblem protrudes, said section being visible on said front side, and said emblem having a rear holding projection protruding laterally with respect to said opening and being attached to said cover, and receiving pockets being formed within said wall on its rear side, edge portions of said holding projection protruding into said receiving pockets to be embraced by said cover.

12. The gas bag module cover assembly according to claim 11, wherein said cover has at least one flap which when said cover is opened exposes an outlet opening for said gas bag and wherein said holding projection protrudes from said flap via a hinge region associated with said flap into a region of said cover adjoining the latter, said emblem being attached to said cover such that said holding projection is bent when said flap is pivoted.

* * * * *